United States Patent
Shivell et al.

(10) Patent No.: US 10,237,949 B1
(45) Date of Patent: Mar. 19, 2019

(54) CONTROL DEVICE HAVING AN INTEGRAL REFLECTING STRUCTURE FOR A SENSING CIRCUIT

(71) Applicant: Lutron Electronics Co., Inc., Coopersburg, PA (US)

(72) Inventors: William Taylor Shivell, Breinigsville, PA (US); Matthew Philip McDonald, Phoenixville, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 16/174,545

(22) Filed: Oct. 30, 2018

Related U.S. Application Data

(63) Continuation of application No. 15/583,819, filed on May 1, 2017, now Pat. No. 10,129,951, which is a continuation of application No. 15/165,559, filed on May 26, 2016, now Pat. No. 9,717,130.

(60) Provisional application No. 62/166,219, filed on May 26, 2015.

(51) Int. Cl.
  *H05B 37/02* (2006.01)
  *H01H 13/83* (2006.01)
  *G09G 3/34* (2006.01)
  *H01H 9/18* (2006.01)

(52) U.S. Cl.
  CPC ....... *H05B 37/0218* (2013.01); *G09G 3/3406* (2013.01); *H01H 13/83* (2013.01); *H01H 9/181* (2013.01); *H01H 2219/038* (2013.01); *H01H 2219/039* (2013.01); *H01H 2219/06* (2013.01); *H01H 2219/062* (2013.01); *H01H 2300/032* (2013.01); *Y02B 90/224* (2013.01); *Y04S 20/14* (2013.01)

(58) Field of Classification Search
  CPC ............... H05B 37/0218; H01H 13/83; H01H 2219/06; H01H 2219/062
  USPC ........................................................ 315/149
  See application file for complete search history.

(56) References Cited

U.S. PATENT DOCUMENTS

| | | | |
|---|---|---|---|
| 6,726,112 B1 | 4/2004 | Ho | |
| 6,803,728 B2 | 10/2004 | Balasubramaniam et al. | |
| 7,523,862 B2 * | 4/2009 | Tracy | H04M 1/22 235/145 R |
| 7,862,350 B2 | 1/2011 | Richter et al. | |
| 8,102,375 B1 | 1/2012 | Feldstein | |
| 8,330,778 B2 | 12/2012 | Song et al. | |

(Continued)

*Primary Examiner* — Daniel D Chang
(74) *Attorney, Agent, or Firm* — Condo Roccia Koptiw LLP

(57) ABSTRACT

A wall-mounted keypad may include a light detector circuit located inside the keypad that is configured to measure an ambient light level in a space. The light detector circuit may receive ambient light through an aperture that is hidden from view by the keypad. The keypad may include a reflector for directing ambient light onto the light detector circuit. The keypad may include an enclosure that houses the light detector circuit. The enclosure may define a recess that exposes at least a portion of the light detector circuit. The enclosure may include a reflector that may focus ambient light received through the aperture onto the light detector circuit. The keypad may include a control circuit that may be configured to illuminate the indicia of respective buttons of the control device in response to actuations of the one or more buttons, in accordance with the measured ambient light level.

21 Claims, 12 Drawing Sheets

(56) References Cited

U.S. PATENT DOCUMENTS

| | | |
|---|---|---|
| 8,393,747 B2 | 3/2013 | Kevelos et al. |
| 8,493,371 B2 | 7/2013 | Gettemy |
| 8,665,203 B2 | 3/2014 | Abe |
| 8,917,024 B2 | 12/2014 | Sloan et al. |
| 9,084,310 B2 | 7/2015 | Bedell et al. |
| 9,321,349 B2 | 4/2016 | Graumann et al. |
| 9,596,423 B1 | 3/2017 | Molgaard |
| 2002/0024529 A1 | 2/2002 | Miller et al. |
| 2002/0118182 A1 | 8/2002 | Luther Weindorf |
| 2005/0135103 A1 | 6/2005 | Evans |
| 2006/0060658 A1 | 3/2006 | Proffitt et al. |
| 2007/0291469 A1 | 12/2007 | Chen |
| 2009/0207122 A1 | 8/2009 | Cheng et al. |
| 2010/0127628 A1 | 5/2010 | Kunimori et al. |
| 2012/0176420 A1 | 7/2012 | Liu |
| 2013/0147981 A1 | 6/2013 | Wu |
| 2014/0001977 A1 | 1/2014 | Zacharchuk et al. |
| 2015/0069221 A1 | 3/2015 | Sloan et al. |
| 2016/0047163 A1 | 2/2016 | Blair et al. |
| 2016/0307714 A1 | 10/2016 | Bhate et al. |
| 2016/0353547 A1 | 12/2016 | Shivell et al. |

\* cited by examiner

CONTROL DEVICE HAVING AN INTEGRAL REFLECTING STRUCTURE FOR A SENSING CIRCUIT

CROSS-REFERENCE TO RELATED APPLICATIONS

This application is a continuation of U.S. patent application Ser. No. 15/583,819, filed May 1, 2017, which is a continuation of U.S. patent application Ser. No. 15/165,559, filed May 26, 2016, now issued as U.S. Pat. No. 9,717,130 on Jul. 25, 2017, which claims priority to U.S. provisional patent application No. 62/166,219, filed May 26, 2015, both of which are incorporated herein by reference in their respective entireties.

BACKGROUND

Home automation systems, which have become increasing popular, may be used by homeowners to integrate and control multiple electrical and/or electronic devices in their homes. For example, a homeowner may connect appliances, lights, blinds, thermostats, cable or satellite boxes, security systems, telecommunication systems, and the like to each other via a wireless network.

The homeowner may control such connected devices using, for instance, a central controller, a dedicated remote control device such as a wall-mounted keypad, a user interface provided via a phone, tablet, computer, or other device that is directly connected to a home network or remotely connected via the Internet, or the like. Connected devices may be configured to communicate with each other and/or with a control device, for example to improve their efficiency, convenience, and/or their usability.

However, known dedicated remote control devices, such as wall-mounted keypads, for example, typically exhibit one or more undesirable characteristics. For example, in known wall-mounted keypads that are backlit it may be difficult for a user to distinguish an actively selected button from an adjacent unselected button due to ambient light in a space where the keypad is installed. In other known wall-mounted keypads, the lens of a light detector that measures ambient light may be installed on a faceplate of the keypad. However, such a solution may be aesthetically unpleasing.

SUMMARY

As described herein, a control device that is configured as a wall-mounted keypad may include a light detector circuit that is located in an interior of the control device and that is configured to measure a light level of ambient light in a space in which the keypad is installed. The light detector circuit may be, for example, a photodiode. The keypad may define an aperture through which the ambient light may be received at the light detector circuit. The aperture may be hidden from view by one or more components of the keypad. The keypad may include a reflector for directing the light received through the aperture onto the light detector circuit.

The keypad may include a faceplate and an adapter that is configured to be mounted to a structure. The faceplate and the adapter may be configured to be removably attached to one another. The adapter may include a lower wall that defines the aperture. The keypad may include an enclosure that houses the light detector circuit. The enclosure may be attached to an inner surface of the faceplate. The enclosure may define a recess that exposes at least a portion of the light detector circuit. The enclosure may include a reflector that may focus ambient light received through the aperture on the light detector circuit. The reflector may include a reflective surface that is configured to direct ambient light onto a light-receiving surface of the light detector circuit. The reflective surface may operate as a parabolic reflector.

The keypad may include one or more buttons having indicia that are indicative of functions performed by the keypad in response to actuation of the buttons. The indicia may be configured to be illuminated from an interior of the keypad. The keypad may include one or more light sources that are configured to illuminate the buttons. The keypad may include a control circuit that may be configured to control the one or more light sources to illuminate indicia of respective buttons in response to actuations of one or more buttons, in accordance with the ambient light level measured by the light detector circuit.

DETAILED DESCRIPTION

Figure 1:
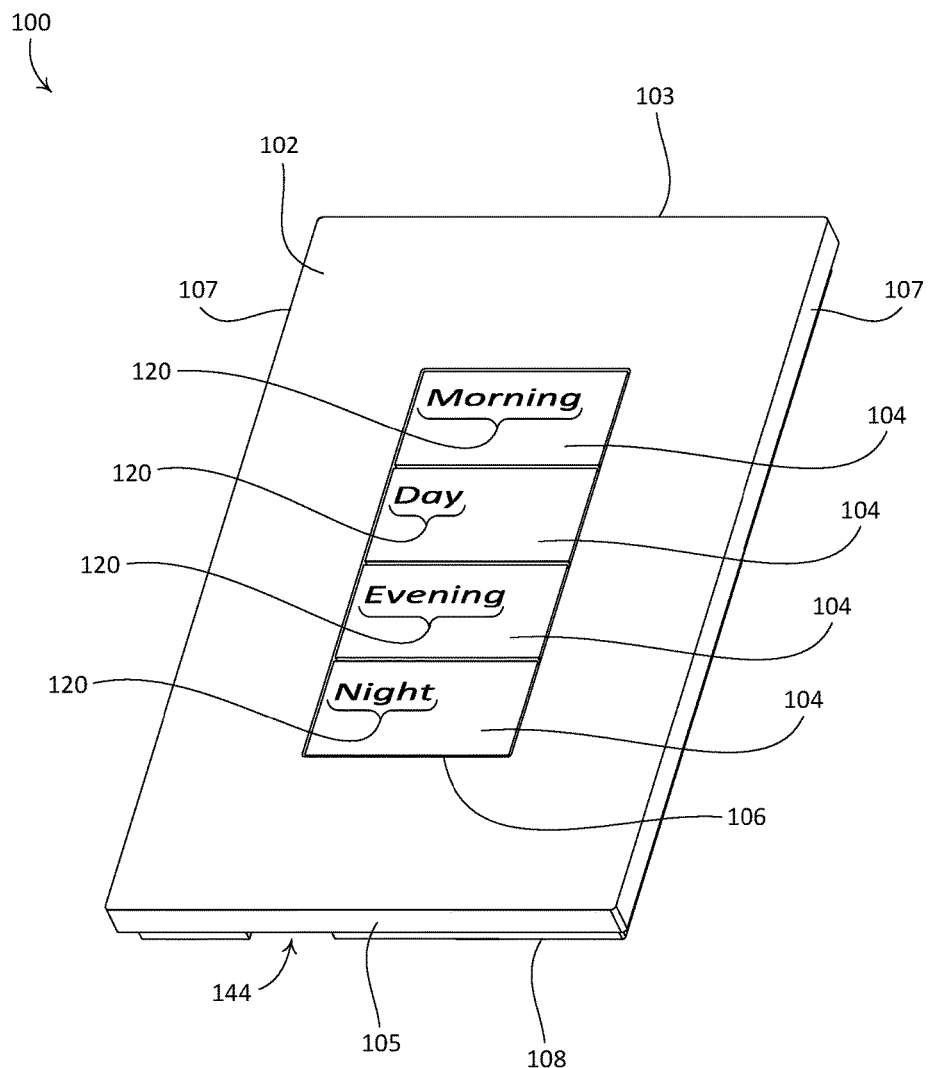
FIG. 1 is a front-facing perspective view of an example control device, configured as a wall-mounted keypad, for use in a load control system for controlling the amount of power delivered to one or more electrical loads.
Figure 2:
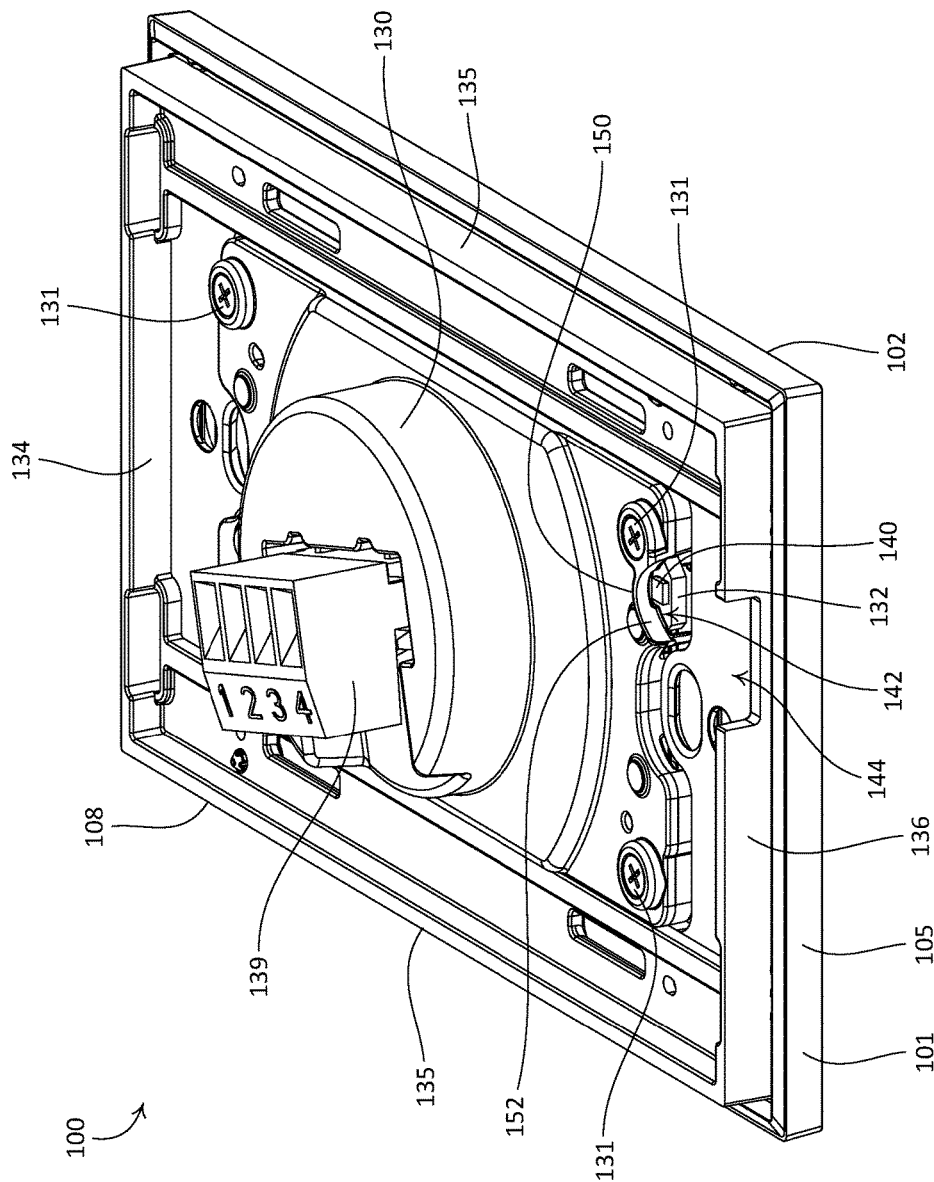
FIG. 2 is a rear-facing perspective view of the example control device illustrated in FIG. 1, with a faceplate component of the control device attached to an adapter component of the control device.
Figure 3:
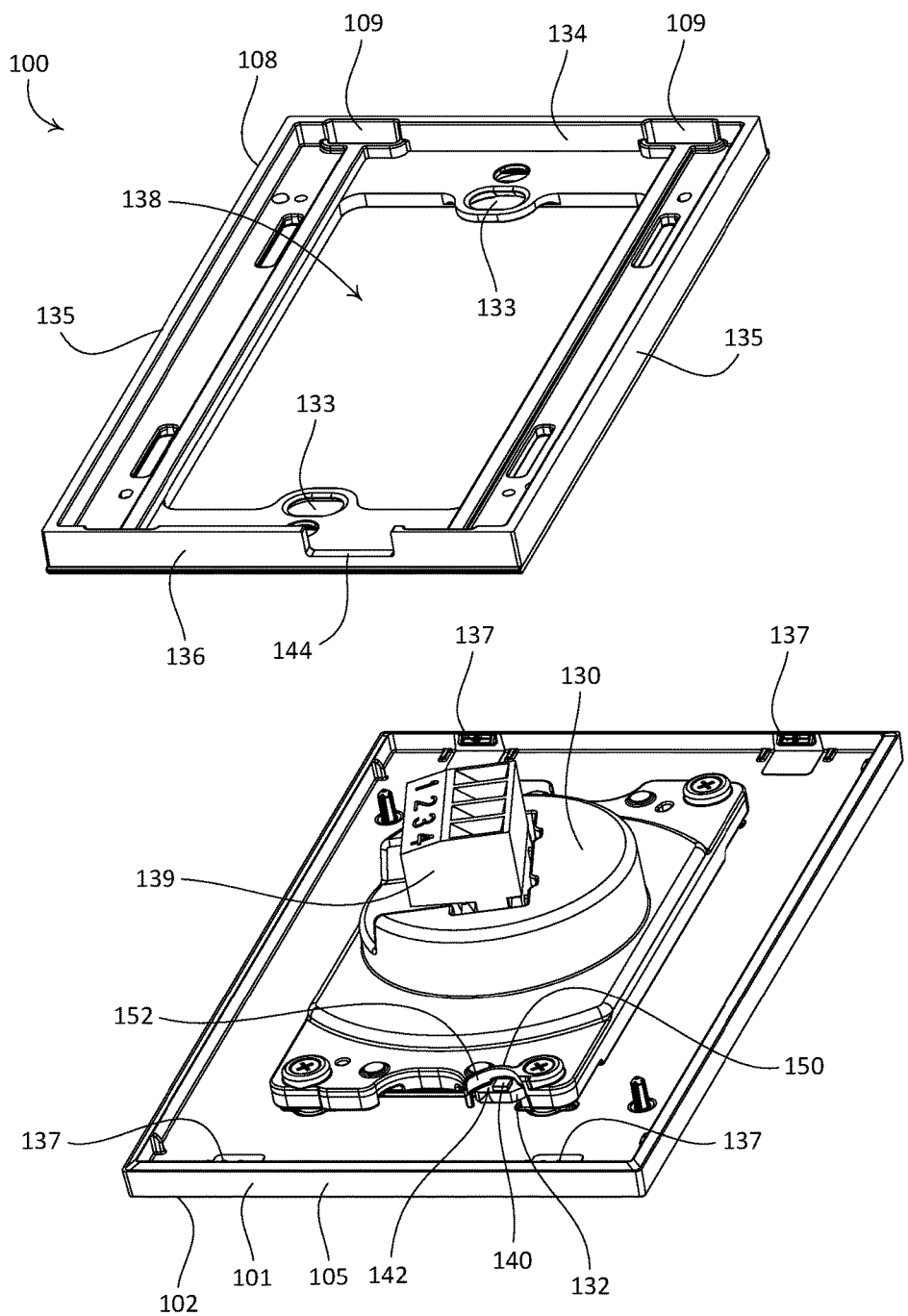
FIG. 3 is rear-facing exploded rear view of the example control device illustrated in FIG. 1, with the faceplate detached from the adapter.

FIGS. 1-5 depict an example control device that is configured for use in a load control system for controlling one or more load control devices, such as dimming modules, and/or one or more electrical loads, such as lighting loads, motorized window treatments, or the like. As shown, the example control device is configured as a wall-mounted keypad 100. The keypad 100 may include a faceplate 102 and an adapter 108. The faceplate 102 and the adapter 108 may be configured to be removably attachable to each other (e.g., as shown in FIGS. 2 and 3). The faceplate 102 and the adapter 108 may together be referred to as a faceplate assembly. The faceplate 102 and the adapter 108 may be made of any suitable material, and may be made of the same or different materials. For example, the faceplate 102 and the adapter 108 may be made of plastic.

The keypad 100 may further include one or more buttons 104, such as the illustrated four buttons 104. The faceplate 102 may define an opening 106 that extends therethrough and that is configured to at least partially receive the buttons 104. The faceplate 102 and the buttons 104 may have respective metallic surfaces. The adapter 108 may be configured to be mounted to a structure, such as a structure within an interior wall of a building. The illustrated keypad 100 may be configured to control a load control device, such as a load control device configured to control an amount of power delivered to one or more electrical loads (e.g., one or more lighting loads) from a power source (e.g., an alternating-current (AC) power source).

The keypad 100 may be configured to transmit one or more digital messages to one or more external load control devices via a communication link. The digital messages may, for example, comprise commands that cause the external load control devices to control corresponding electrical loads. The communication link may comprise a wired communication link or a wireless communication link, such as a radio-frequency (RF) communication link. Alternatively, the keypad 100 may comprise an internal load control circuit for controlling the power delivered to one or more electrical loads. Examples of load control systems having remote control devices, such as the keypad 100, are described in greater detail in commonly-assigned U.S. Pat. No. 6,803,728, issued Oct. 12, 2004, entitled "System For Control Of Devices," and U.S. Patent Application Publication No. 2014/0001977, published Jan. 2, 2014, entitled "Load Control System Having Independently-Controlled Units Responsive To A Broadcast Controller," the entire disclosures of which are incorporated herein by reference.

Each button 104 may have a body that may be made of a translucent (e.g., transparent, clear, and/or diffusive) material, such as plastic, and may further have a metallic outer surface. For example, each button 104 may have a translucent plastic body (not shown) and a veneer made of an opaque material, such as a metallic sheet (not shown), that may be adhered to a front surface of the body of the button 104.

The buttons 104 may include indicia 120, such as text, icons, or the like (e.g., as shown in FIG. 1). The indicia 120 may be cut through the veneer of the buttons 104, for example using a laser cutting process, a machining process, photo-etching, or another metal-removal process. The indicia 120 may be filled, for instance with a translucent or clear material. Alternatively, the indicia 120 may be etched into surfaces (e.g., outer surfaces and/or inner surfaces) of the respective buttons 104, may be printed on the outer surfaces of the buttons 104, or may be otherwise formed or displayed on the buttons 104. The indicia 120 may be indicative of respective functions that are invoked by depressing the corresponding buttons 104 of the keypad 100, for example causing the keypad 100 to transmit a command to an associated load control device that causes the load control device to adjust a corresponding lighting load in accordance with a preset, such as a lighting scene.

Alternatively, the buttons 104 may be coated with another type of opaque material, such as paint, and the indicia 120 may be etched into the opaque material. In addition, the bodies of the buttons 104 may alternatively be made of another type of translucent material, such as glass. An opaque material, such as paint, may be coated onto respective rear surfaces of the bodies of the buttons 104 and the indicia 120 may be etched into the opaque material.

The buttons 104 may be backlit to allow the indicia 120 to be read in a wide range of ambient light levels. The buttons 104 may be illuminated by one or more light sources, such as light emitting diodes (LEDs) that are located inside an interior of the keypad 100, for instance behind and/or to the side of each button 104. Illumination from the LEDs may shine through the translucent body, but not through the metallic sheet, such that the indicia 120 of each button 104 is illuminated.

The keypad 100 may operate to backlight the buttons 104, such that the indicia 120 of a button 104 that is associated with a selected preset (e.g., an "active" preset) is illuminated to an active surface illumination intensity $L_{SUR1}$, and the indicia 120 of remaining buttons 104 of the keypad that may be associated with other presets (e.g., "inactive" presets) are illuminated to an inactive surface illumination intensity $L_{SUR2}$. The active surface illumination intensity $L_{SUR1}$ may be greater than the inactive surface illumination intensity $L_{SUR2}$, such that a user of the keypad 100 may identify which of the presets is selected based upon the intensity of the illumination of the indicia 120 of the buttons 104 of the keypad 100. Alternatively, the faceplate 102 of the keypad 100 may include a body (not shown), for instance made of plastic, and a metallic veneer with indicia cut therethrough that is attached to the body and that may be illuminated by the LEDs (e.g., backlit).

The keypad 100 may include an enclosure 130 that is configured to house a printed circuit board (PCB) 132 on which the electrical circuitry of the keypad 100 may be mounted. The enclosure 130 may be configured to be mechanically attached to the faceplate 102, for instance using screws 131, such that the buttons 104 may be received in the opening 106 of the faceplate 102. The adapter 108 may be configured to be mounted to a structure, for instance via mounting screws (not shown) received through mounting openings 133. As shown, the adapter 108 may include an upper wall 134, a lower wall 136, and opposed side walls 135 that extend from the upper wall 134 to the lower wall 136. The upper wall 134, side walls 135, and lower wall 136 may be referred to as outer walls of the adapter 108, and may define a perimeter of the adapter 108. Respective surfaces of the upper wall 134, side walls 135, and lower wall 136 may be configured to abut an outer surface of the structure when the adapter 108 is mounted to the structure.

The faceplate 102 and the adapter 108 may be configured to be removably attached to each other. For example, as shown the faceplate 102 may snap-fit connectors 137 and the adapter 108 may define recesses 109 that may each be configured to receive and engage with a corresponding one of the snap-fit connectors 137. The adapter 108 may define an opening 138 that extends therethrough and that is configured to at least partially receive the enclosure 130 when the faceplate 102 is attached to the adapter 108. The keypad 100 may further include an electrical connector 139 which may electrically connect circuitry on the PCB 132 to a power source, such as an external direct-current (DC) power source, and/or may connect the keypad to 100 a communication link, such as a wired communication link.

An ambient light level, for example in a space (e.g., a room) in which the keypad 100 is installed, may affect the ability of a user of the keypad 100 to read the indicia 120 on the buttons 104. For example, if the contrast between the brightness of the illuminated indicia 120 of a button 104 and the brightness of an adjacent surface of the button 104 is too low, the illuminated indicia 120 may appear washed out to the user. Accordingly, the keypad 100 may include an ambient light detection circuit having a photodiode 140 (or an integrated circuit having a photodiode), which may be mounted to the PCB 132, for instance to a rear surface of the PCB 132, and may be configured to measure a light level of the ambient light in the space. The photodiode 140 may be configured to receive light through a light receiving surface that extends parallel to the rear surface of the PCB 132. As shown, the enclosure 130 may define a recess 142 that may be configured to expose a portion of the PCB 132 on which the photodiode 140 is mounted.

Figure 4:
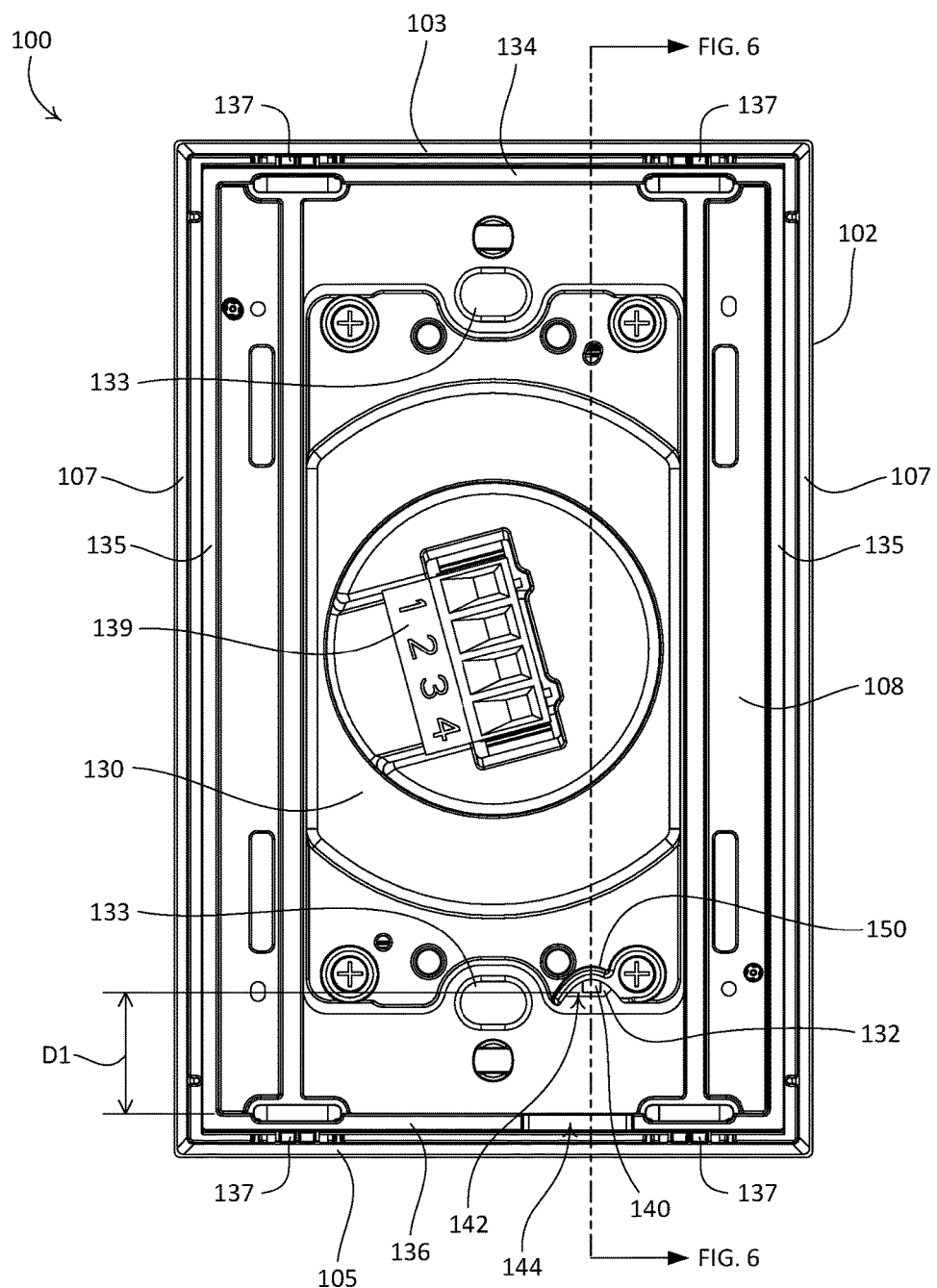
FIG. 4 is a rear view of the example control device illustrated in FIG. 1.
Figure 5:
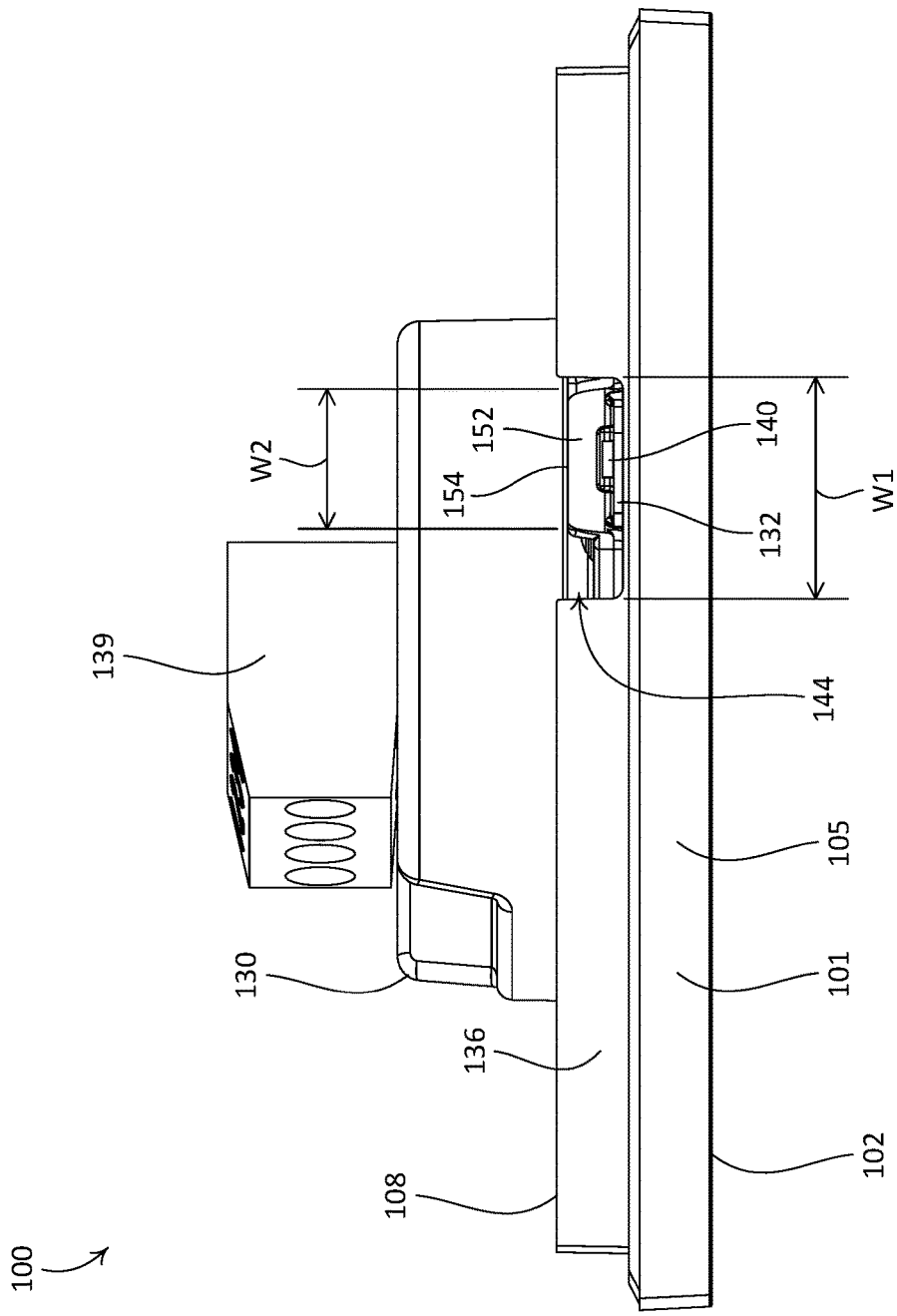
FIG. 5 is a bottom view of the example control device illustrated in FIG. 1.

When the keypad 100 is mounted to a structure, the photodiode 140 may be enclosed by the enclosure 130, the upper, side, and lower walls 134, 135, and 136 of the adapter 108, and the structure. The keypad 100 may define an aperture through which ambient light may enter the keypad 100 and be received by the photodiode 140. For example, as shown the lower wall 136 of the adapter 108 may define an aperture 144 that extends therethrough. The photodiode 140 may receive ambient light through the aperture 144, which may enable the ambient light detection circuit to measure the light level of the ambient light in the space. As shown, the aperture 144 may be characterized by a width W1 (e.g., approximately 0.500") as shown in FIG. 5. The photodiode 140 may be positioned a distance D1 (e.g., approximately 0.560") from the aperture 144 (e.g., from an inner side of the lower wall 136 of the adapter 108) as shown in FIG. 4.

As shown, the faceplate 102 may include a plate shaped body and perimeter walls that extend rearward from the body, including an upper wall 103, a lower wall 105, and opposed side walls 107 that extend from the upper wall 103 to the lower wall 105. The upper, side, and lower walls 103, 105, and 107 of the faceplate 102 may define an outer perimeter of the faceplate 102 that extends beyond the upper, side, and lower walls 134, 135, and 136 of the adapter 108 such that the aperture 144 is hidden from view when the faceplate 102 is attached to the adapter 108 and the keypad 100 is mounted to a structure. Stated differently, the faceplate 102 may be wider than the adapter 108 in a lateral direction, and may be longer than the adapter 108 in a longitudinal direction so as to hide the aperture 144 from the view of a user when the keypad 100 is mounted to a structure. Locating the aperture 144 in the lower wall 136 of the adapter 108 may prevent the recess 142 from collecting dust that might hinder operation of the photodiode 140. For example, if the aperture 144 were located in the upper wall 134 of the adapter 108, dust may fall through the aperture 144 and collect in the recess 142, such that the dust blocks ambient light from being received at the light receiving surface of the photodiode 140. However, it should be appreciated that the keypad 100 is not limited to the illustrated respective locations of the photodiode 140 and the aperture 144, and furthermore is not limited to the illustrated orientations of the photodiode 140 and the aperture 144 relative to each other.

Figure 6:
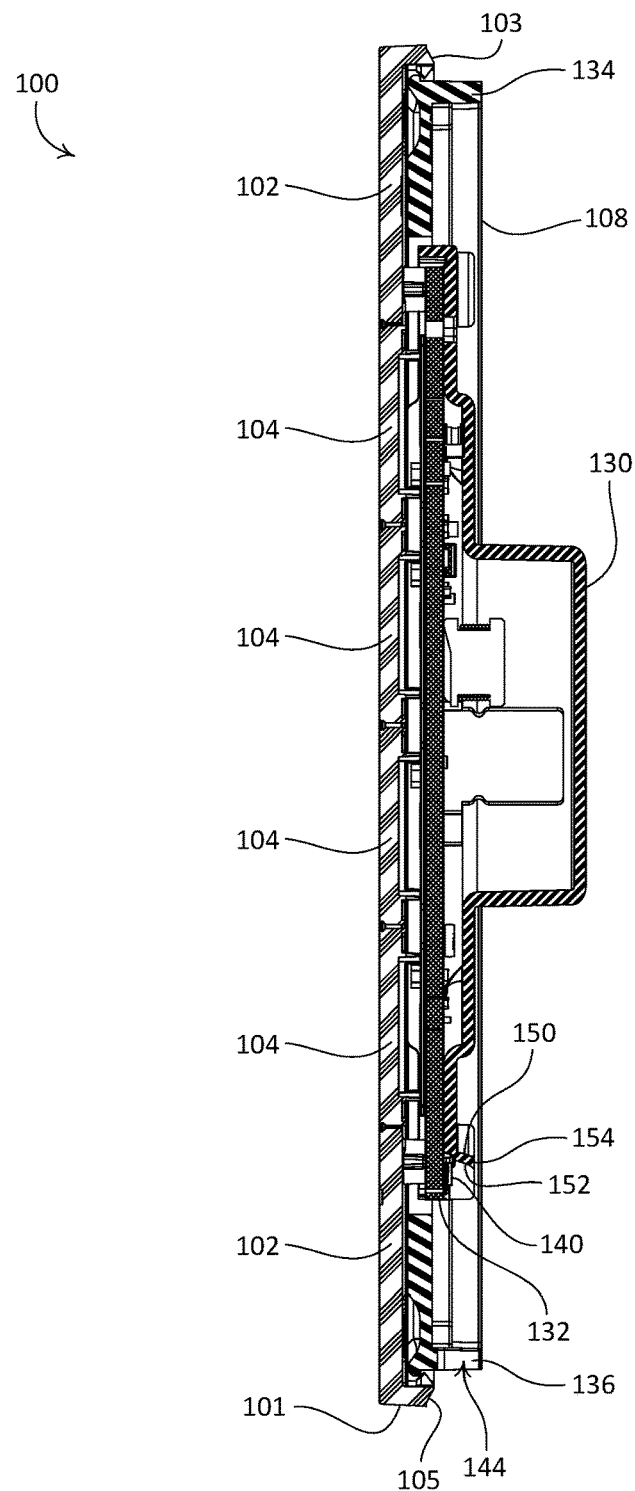
FIG. 6 is a side section view of the example control device illustrated in FIG. 1.
Figure 7:
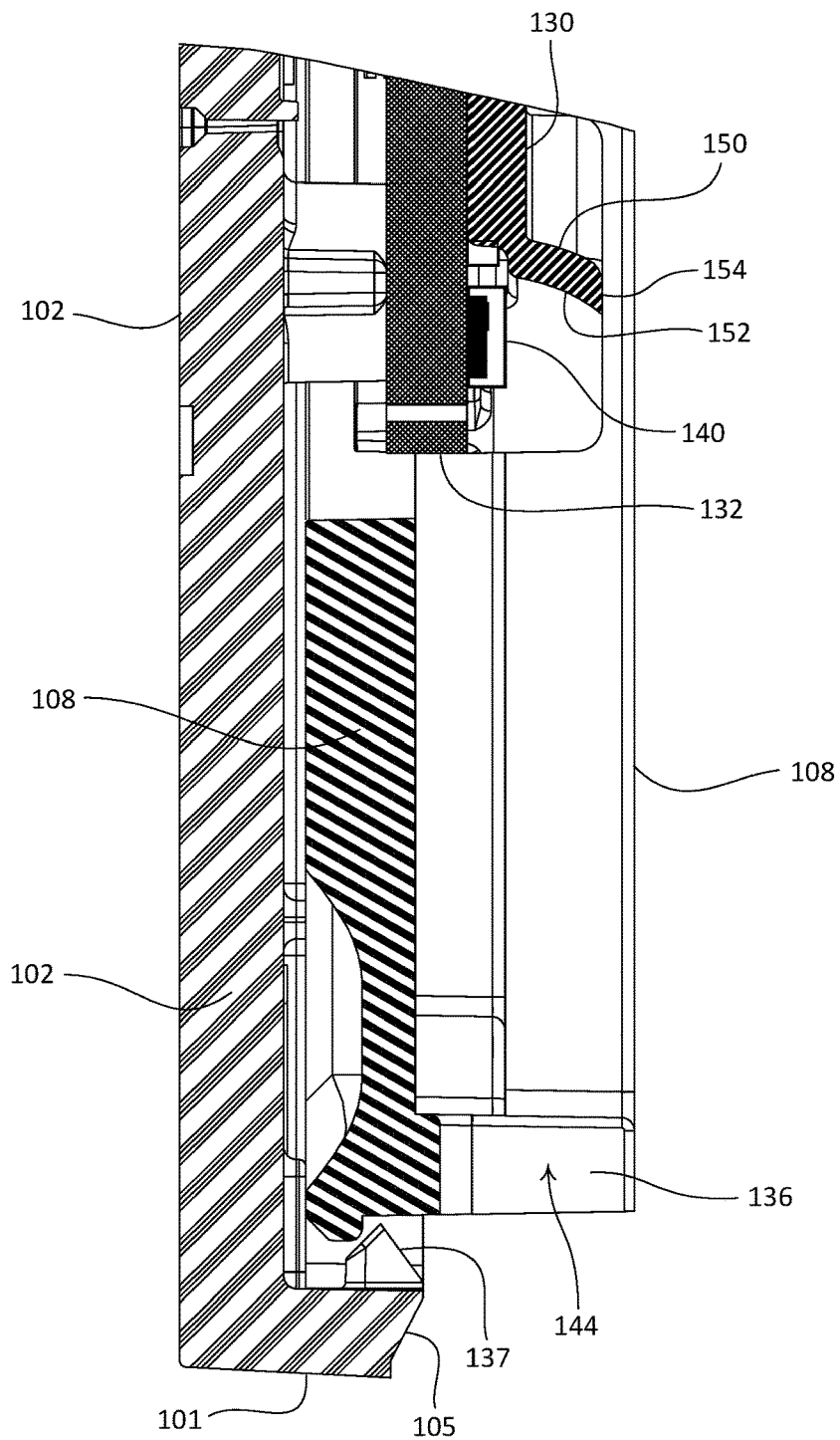
FIG. 7 is an enlarged portion of the section view illustrated in FIG. 6.

The keypad 100 may include a reflector that may be configured to focus ambient light that enters the interior of the keypad 100 through the aperture 144 onto the light receiving surface of the photodiode 140. For example, as shown the enclosure 130 may include an integral reflector 150 that may be configured to direct ambient light received through the aperture 144 onto the photodiode 140. As shown in FIGS. 5 and 6, for example, the reflector 150 may define a concave reflective surface 152 (e.g., a mirror) for directing and/or focusing ambient light that enters the keypad 100 through the aperture 144 onto the photodiode 140. The reflective surface 152 may be configured to operate as a parabolic reflector or may be define a curved surface similar to that of a parabolic reflector. As shown, the reflective surface 152 may extend from near the rear surface of the PCB 132 to an upper edge 154 of the reflector 150 that is spaced from the rear surface of the PCB 132. The reflector 150 may be configured such that the upper edge 154 thereof extends rearward away from the PCB 132 and outward relative to the recess 142 and extends over a portion of the photodiode 140. In this regard, the reflector 150 may define a canopy that partially encloses the photodiode 140, such that the photodiode 140 is positioned partly under the upper edge 154 of the reflector (e.g., as shown in FIG. 7). The upper edge 154 of the reflector 150 may define a curved perimeter (e.g., as shown in FIG. 4). As shown in FIG. 5, the reflector 150 may be characterized by a width W2 (e.g., approximately 0.33") at a base of the reflector 150 where the enclosure 130 contacts the PCB 132. It should be appreciated that the reflector 150 is not limited to the illustrated geometry. The enclosure 130, and thus the reflector 150, may be made of white glass-enforced polycarbonate. The reflective surface 152 may be defined by a coating of shiny material that is applied to the reflector.

It should be appreciated that the keypad 100 is not limited to the illustrated faceplate 102 and adapter 108. For example, the keypad 100 may be implemented with a faceplate and adapter having the same or different configurations (e.g., geometries) from those illustrated and described herein. The enclosure 130 may be implemented with alternative configurations of the faceplate and/or adapter. To illustrate, the enclosure 130 may be attached to faceplates having sizes and/or shapes that are different from the faceplate 102. Such faceplates may be configured to attach to respective adapters having sizes and/or shapes that are different from the adapter 108. Accordingly, the distance D1 from the aperture 144 to the photodiode 140 (e.g., as shown in FIG. 4) may vary based upon the particular configurations of the faceplate and/or adapter which the enclosure 130 is implemented with. For example, in some example implementations the distance D1 may be long enough to inhibit proper operation of the photodiode 140, for instance if the photodiode 140 receives too little ambient light. In such an implementation, the keypad 100 may include a light guide that is configured to collect ambient light at the aperture 144 and to guide the ambient light to the photodiode 140. To illustrate, an example light guide may be designed such that an amount of ambient light that is received by the photodiode 140 of a first keypad implementation that includes a light guide, and wherein the distance D1 has a first value, is approximately the same as the amount of ambient light that is received by the photodiode 140 of a second keypad implementation in which the distance D1 has a second value that is shorter than the first value, and that does not include a light guide. Stated differently, a light guide may be provided in example implementations of the keypad 100 where the distance D1 inhibits desired operation of the photodiode 140. In some example implementations that include a light guide, the reflector 150 may be omitted.

Figure 8:
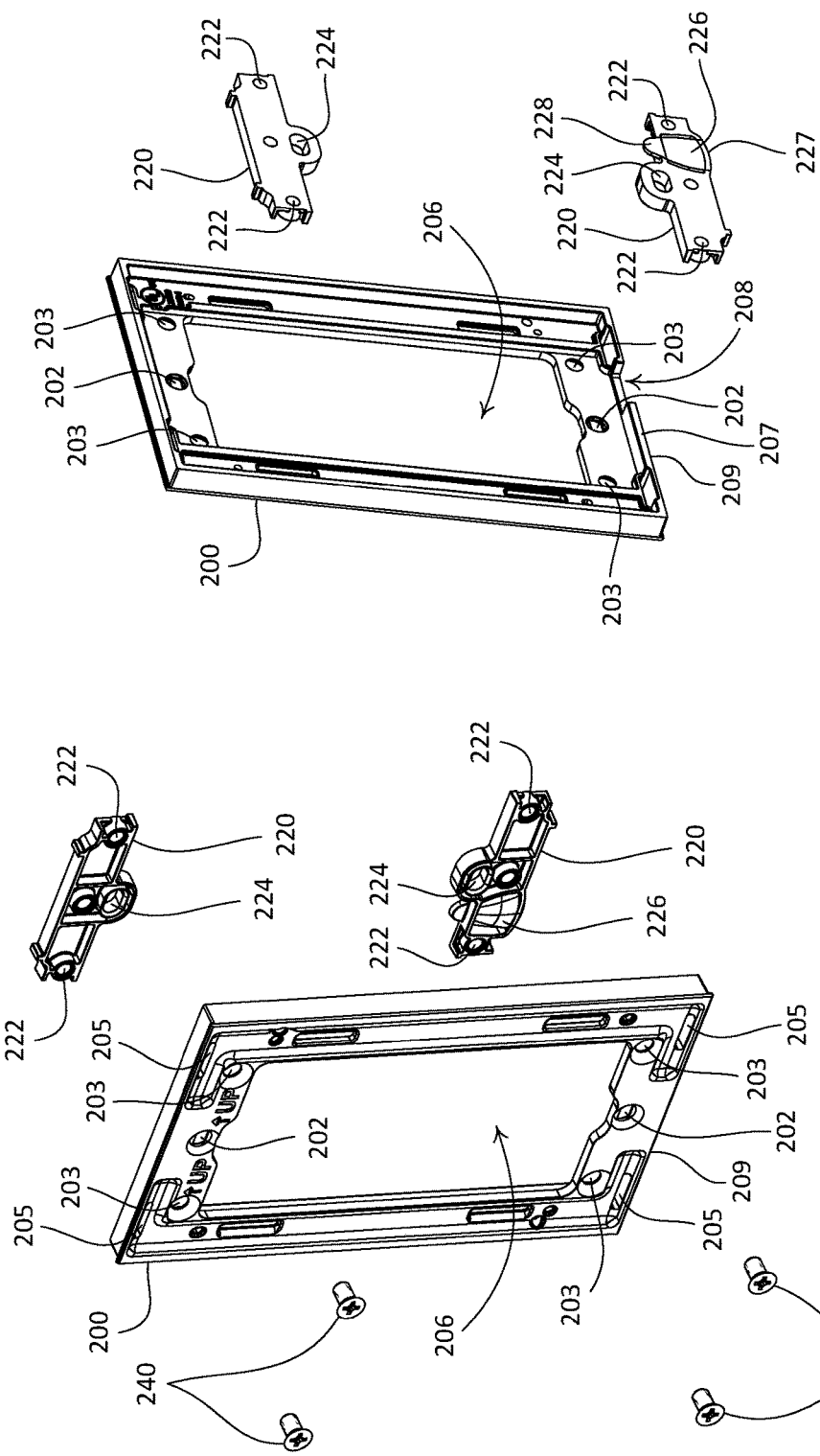
FIG. 8A is a front-facing exploded view of another adapter to which the faceplate of the example control device illustrated in FIG. 1 may be attached.
FIG. 8B is a rear-facing exploded view of the adapter illustrated in FIG. 8A.

FIGS. 8A and 8B depict another example adapter 200 that may be implemented in the keypad 100, for example in place of the adapter 108. The adapter 200 may be configured to be attached to a structure, such as a structure within an interior wall of a building. As shown, the adapter 200 defines a pair of openings 202 that extend therethrough. The adapter 200 may be configured such that the openings 202 align with a structure to which the adapter 200 is to be attached. The adapter 200 may also be configured to attach directly to an electrical wallbox. For example, as shown, the keypad 100 may include a pair of mounting tabs 220 that are removably attachable to the adapter 200. Each mounting tab 220 may define a pair of openings 222 that extend therethrough. The adapter 200 may define corresponding openings 203 that extend therethrough and that align with the openings 222 of the mounting tabs 220. The mounting tabs 220 may be attached to the adapter 200 using fasteners, such as screws 240 that are disposed into the openings 203 of the adapter 200 and driven into place in the openings 222 of the mounting tabs 220. Each mounting tab 220 may define a mounting opening 224 that extends therethrough. When the mounting tabs 220 are attached to the adapter 200, the respective mounting openings 224 may be configured similarly to the mounting openings 133 of the adapter 108. For example, each mounting tab 220 may be configured such that, when the mounting tab 220 is attached to the adapter 200, the mounting opening 224 aligns with a corresponding mounting hole in an electrical wallbox.

The adapter 200 may be configured such that the faceplate 102 and the adapter 200 may be removably attached to each other. For example, as shown the adapter 200 may define recesses 205. Each recess 205 may be configured to receive and engage with a corresponding one of the snap-fit connectors 137 of the faceplate 102. The adapter 200 may define an opening 206 that extends therethrough and that is configured to at least partially receive the enclosure 130 when the faceplate 102 is attached to the adapter 200. As shown, the adapter 200 may define an aperture 208 that extends through a lower wall 207 of the adapter 200. The aperture 208 may, for example, be configured similarly to the aperture 144 of the adapter 108. In this regards, the photodiode 140 may receive ambient light through the aperture 208, which may enable the ambient light detection circuit to measure the light level of the ambient light in a space in which the keypad 100 is installed.

As shown, one of the mounting tabs 220, such as a lower mounting tab 220, may include a light guide 226 that is configured to guide ambient light that is received through the aperture 208 into an interior of the keypad 100, toward the reflector 150 and onto the light detector circuit, for instance onto the photodiode 140. The light guide 226 may define a lower surface 227 that is configured to be received in the aperture 208 of the adapter 200. As shown, the lower surface 227 may be configured as a curved lower surface 227. The light guide 226 may be configured such that when the lower mounting tab 220 is attached to the adapter 200, at least a portion of the lower surface 227 extends beyond an outer surface 209 of a lower wall 207 of the adapter 200, but is still hidden from view behind the faceplate 102. Additionally, the light guide 226 may be configured such that when the lower mounting tab 220 is attached to the adapter 200, at least a portion of the lower surface 227 extends beyond an outer surface of 101 of the lower wall 105 of the faceplate 102.

Stated more generally, the light guide 226 may be configured such that the lower surface 227 protrudes beyond a lower surface of the keypad 100. Protrusion of a portion of the light guide 226 beyond a lower surface of the adapter 200 and/or the faceplate 102 may allow the light guide 226 to collect ambient light that is received by the portion of the lower surface 227 that protrudes beyond the lower wall 207 of the adapter and/or the lower wall 101 of the faceplate 102, in addition to ambient light that enters the light guide 226 from below the adapter 200. Such a configuration of the light guide 226 may enable the light detector circuit to more accurately measure the ambient light in a space, for instance when the keypad 100 is installed above a dark surface that reflects little light, such a piece of furniture having a dark and/or matte finish. As shown, the light guide 226 may further define a tab 228 that may be configured to be received in the recess 142 of the enclosure 130. The tab 228 may operate to guide ambient light to the reflective surface 152 of the reflector 150.

It should be appreciated that the light guide 226 is not limited to the illustrated configuration. For example, the light guide 226 may be alternatively configured such that the lower surface 227 does not protrude beyond the lower wall 207 of the adapter 200, for example such that the lower surface 227 aligns substantially flush with the outer surface of the lower wall 207 of the adapter 200 when the lower mounting tab 220 is attached to the adapter 200.

The keypad 100 may be configured to adjust the active and inactive surface illumination intensities $L_{SUR1}$, $L_{SUR2}$ in response to the measured light level of the ambient light. For example, the keypad 100 may be configured to increase the active and inactive surface illumination intensities $L_{SUR1}$, $L_{SUR2}$ if the ambient light level increases, and to decrease the active and inactive surface illumination intensities $L_{SUR1}$, $L_{SUR2}$ if the ambient light level decreases.

Figure 9:
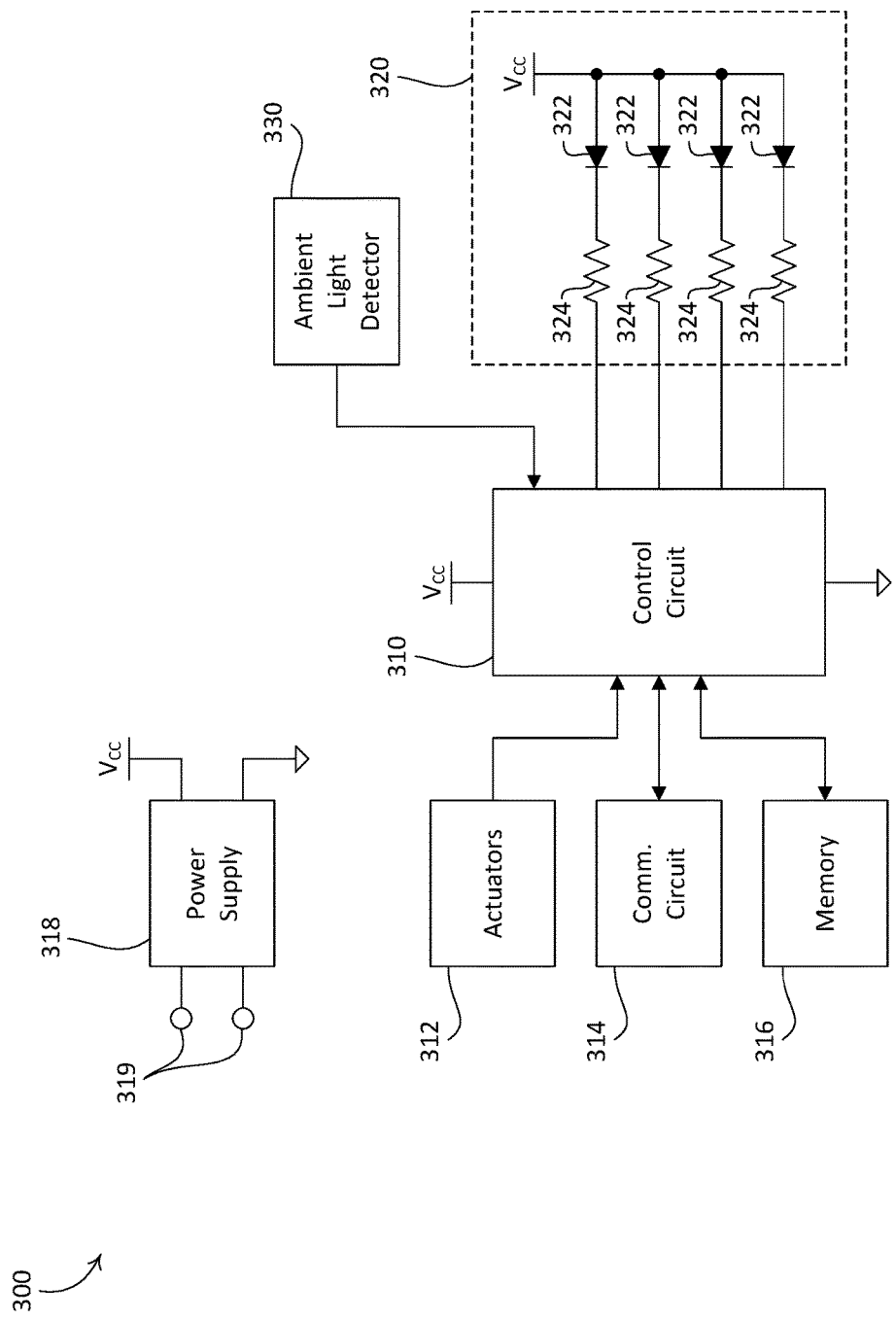
FIG. 9 is a simplified block diagram of electrical components of the example control device illustrated in FIG. 1.

FIG. 9 is a simplified block diagram that illustrates an example control device 300 that may be deployed as, for example, the keypad 100 shown in FIG. 1. The control device 300 may include a control circuit 310, which may include one or more of a processor (e.g., a microprocessor), a microcontroller, a programmable logic device (PLD), a field programmable gate array (FPGA), an application specific integrated circuit (ASIC), or any suitable processing device. The control device 300 may include one or more actuators 312 (e.g., mechanical tactile switches), which may be actuated in response to actuations of the buttons 104, for example. The control circuit 310 may be coupled to the actuators 312 for receiving user inputs.

The control device 300 may further include a communication circuit 314, such as a wired communication circuit or a wireless communication circuit (e.g., an RF transmitter coupled to an antenna for transmitting RF signals). The control circuit 310 may be coupled to the communication circuit 314 for transmitting digital messages, for example in response actuations of the actuators. Alternatively, the communication circuit 314 may include an RF receiver for receiving RF signals, an RF transceiver for transmitting and receiving RF signals, or an infrared (IR) transmitter for transmitter IR signals. In addition, the control circuit 310 may be configured to receive a digital message including, for example, a selected preset and/or the status of an electrical load controlled by an external load control device. The control device 300 may also include a memory 316 communicatively coupled to the control circuit 310. The control circuit 310 may be configured to use the memory 316 for the storage and/or retrieval of, for example, commands and/or preset information to transmit in response to actuations of the buttons 104. The memory 316 may be implemented as an external integrated circuit (IC) or as an internal circuit of the control circuit 310.

The control device 300 may include a power supply 318 for generating a direct-current (DC) supply voltage $V_{CC}$ for powering the control circuit 310, the communication circuit 314, the memory 316, and/or other low-voltage circuitry of the control device 300. The power supply 318 may be coupled to an alternating-current (AC) power source or an external DC power source, for example via electrical connections 319. Alternatively, the control device 300 may comprise an internal power source (e.g., one or more batteries) in place of or in addition to the electrical connections 319, for supplying power to the power supply 318.

The control device 300 may further comprise a backlighting circuit 320 for illuminating indicia on one or more buttons (e.g., the indicia 120 of the buttons 104 of the keypad 100). For example, the backlighting circuit 320 may comprise four LEDs 322 coupled to respective ports on the control circuit 310 and to respective resistors 324. The control circuit 310 may be configured to individually turn each LED 322 on by pulling the respective port low towards circuit common, such that the LED 322 is coupled between the supply voltage $V_{CC}$ and circuit common through the respective resistor 324. The control circuit 310 may be configured to dim the illumination of each LED 322, for instance by pulse width modulating the LED current conducted through each LED 322 and adjusting a duty cycle $DC_{LED}$ of the pulse-width modulated LED current.

While the illustrated control device 300 has one LED 322 for illuminating each of the buttons 104, each LED 322 illustrated in FIG. 9 may comprise one or more LEDs coupled in series or parallel. For example, each LED 322 in FIG. 9 may comprise four LEDs coupled in series. To illustrate, the LEDs 322 may comprise white LEDs, for example part number LTW-C191DS5-LR, manufactured by LITE-ON. Each of the resistors 324 coupled in series with the respective LEDs 322 may have a resistance sized such that the maximum average magnitude of LED current may be approximately 20 mA.

The control circuit 310 may be configured to backlight the buttons 104, such that the indicia 120 of a specific button (e.g., a button having indicia 120 indicative of a selected preset, herein referred to as "the selected button") is illuminated to an active surface illumination intensity $L_{SUR1}$, and the respective indicia 120 of the other buttons 104 are illuminated to an inactive surface illumination intensity $L_{SUR2}$ that is less than the active surface illumination intensity $L_{SUR1}$. To illuminate the indicia 120 of one of the buttons 104 to the active surface illumination intensity $L_{SUR1}$, the control circuit 310 may pulse-width modulate the LED current through the LED 322 behind the button using a first LED duty cycle $DC_{LED1}$ to cause the respective LED 322 to illuminate to a first LED illumination intensity $L_{LED1}$. To illuminate the indicia 120 of one of the buttons 104 to the inactive surface illumination intensity $L_{SUR2}$, the control circuit 310 may pulse-width modulate the LED current through the LED 322 behind the button 104 using a second LED duty cycle $DC_{LED2}$ to cause the respective LED 322 to illuminate to a second LED illumination intensity $L_{LED2}$, which may be less that the first LED illumination intensity $L_{LED1}$.

The control device 300 may further comprise an ambient light detector 330 (e.g., an ambient light detection circuit) for measuring an ambient light level $L_{AMB}$ in a space (e.g., a room) in which the control device 300 is installed. The ambient light detector 330 may generate an ambient light detect signal $V_{AMB}$, which may indicate the ambient light level $L_{AMB}$ and may be received by the control circuit 310. The control circuit 310 may be configured to adjust the first and second LED illumination intensities $L_{LED1}$, $L_{LED2}$ in response to the measured ambient light level $L_{AMB}$ as determined from ambient light detect signal $V_{AMB}$. The control circuit 310 may be configured to increase the first and second LED illumination intensities $L_{LED1}$, $L_{LED2}$ to increase the active and inactive surface illumination intensities $L_{SUR1}$, $L_{SUR2}$ if the ambient light level increases. The control circuit 310 may be configured to decrease the first and second LED illumination intensities $L_{LED1}$, $L_{LED2}$ to decrease the active and inactive surface illumination intensities $L_{SUR1}$, $L_{SUR2}$ if the ambient light level decreases.

The control circuit 310 may be configured to adjust the first and second LED illumination intensities $L_{LED1}$, $L_{LED2}$ by adjusting the duty cycle $D_{CLED}$ through each of the LEDs 322 behind the respective buttons 104. For example, the control circuit 310 may be configured to adjust the first duty cycle $DC_{LED1}$ of the LED current through the LED 322 behind the button 104 having the active preset in response to the measured ambient light level $L_{AMB}$ according an active LED adjustment curve $DC_{ACTIVE}$, and to adjust the second duty cycle $D_{CLED2}$ of the LED current through each of the LEDs 322 behind the buttons 104 having the inactive presets in response to the measured ambient light level $L_{AMB}$ according an inactive LED adjustment curve $DC_{INACTIVE}$. The active LED adjustment curve $DC_{ACTIVE}$ and the inactive LED adjustment curve $DC_{INACTIVE}$ may be stored in the memory 316.

Figure 10:
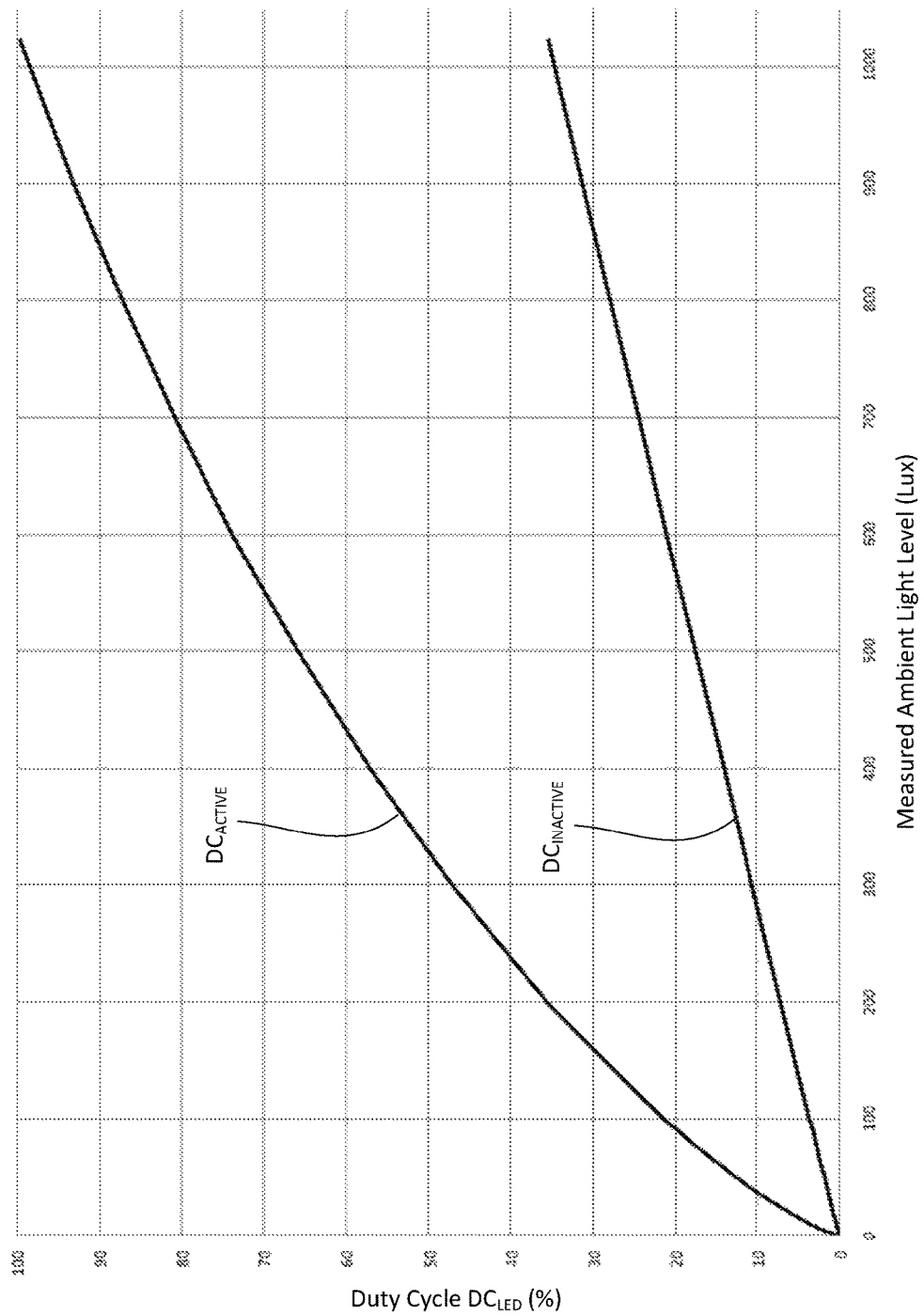
FIG. 10 is a graph that illustrates an example active adjustment curve for adjusting a duty cycle of current conducted through a light-emitting diode behind an active button of a control device in response to a measured ambient light level.
Figure 11:
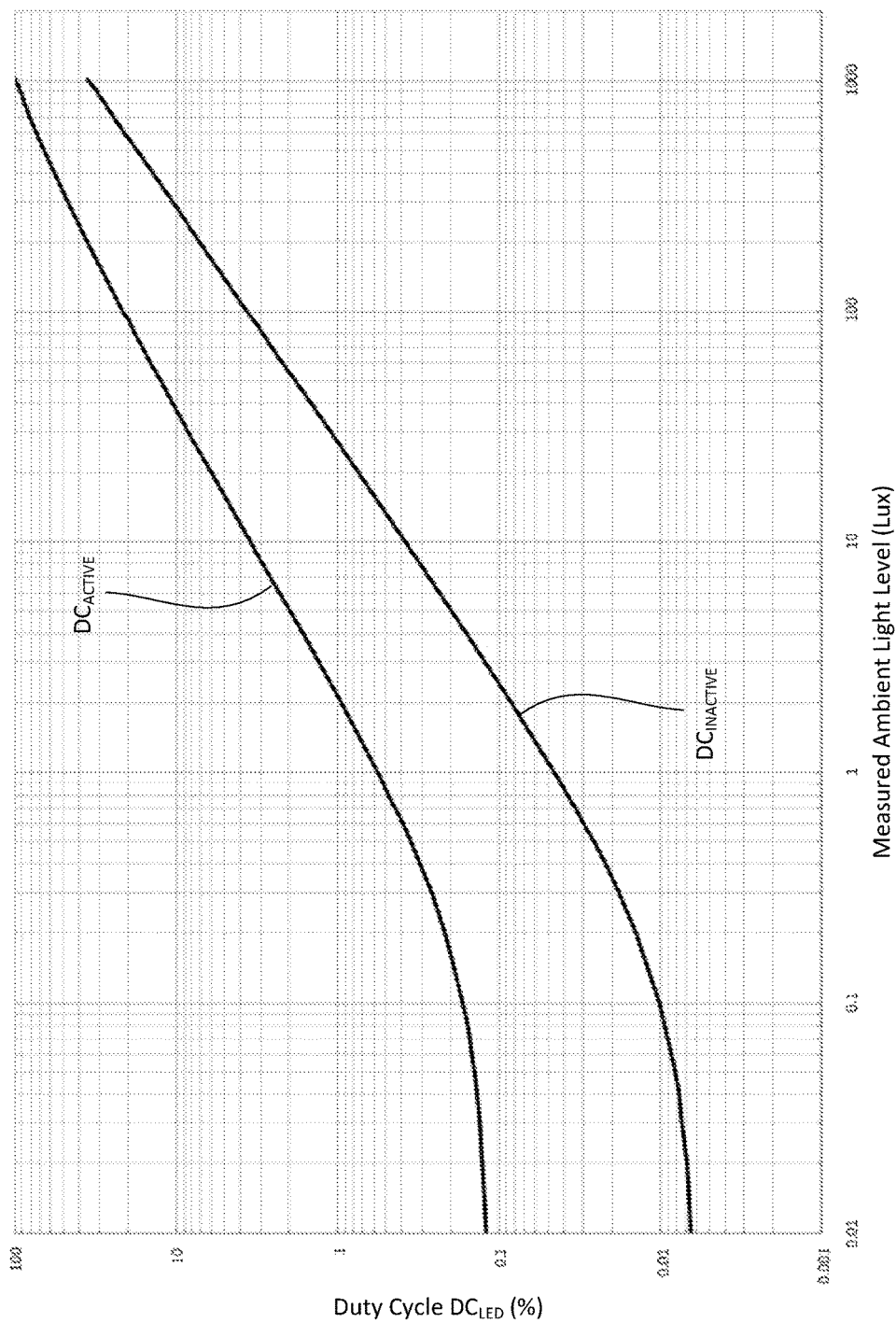
FIG. 11 is a graph that illustrates an example active adjustment curve for adjusting a duty cycle of current conducted through a light-emitting diode behind an inactive button of a control device in response to a measured ambient light level.

FIGS. 10 and 11 illustrate example active and inactive adjustment curves $DC_{ACTIVE}$, $DC_{INACTIVE}$, respectively, for adjusting the duty cycle $DC_{LED}$ of the LED current through each of the LEDs 322 in response to the measured ambient light level $L_{AMB}$. FIG. 10 shows the example active and inactive adjustment curves $DC_{ACTIVE}$ and $DC_{INACTIVE}$ on a linear scale, while FIG. 11 shows the example active and inactive adjustment curves $DC_{ACTIVE}$ and $DC_{INACTIVE}$ on a logarithmic scale. For example, if the measured ambient light level $L_{AMB}$ is approximately 500 Lux, the first duty cycle $DC_{LED1}$ of the LED current through the LED 322 behind the button 104 having the active preset may be controlled to approximately 66%, while the second duty cycle $DC_{LED2}$ of the LED current through each of the LEDs 322 behind the buttons 104 having the inactive presets may be controlled to approximately 17%.

The human eye may have a more difficult time discerning contrast in low ambient light levels than in high ambient light levels. Thus, the first duty cycle $DC_{LED1}$ of the active adjustment curve $DC_{ACTIVE}$ may be, for example, over ten times greater than the second duty cycle $DC_{LED2}$ of the inactive adjustment curve $DC_{INACTIVE}$ near a minimum ambient light level $L_{AMB-MIN}$ (e.g., approximately 0 Lux) as shown in FIGS. 10 and 11. Near a maximum ambient light level $L_{AMB-MAX}$ (e.g., approximately 1000 Lux), the first duty cycle $DC_{LED1}$ of the active adjustment curve $DC_{ACTIVE}$ may be, for example, approximately three times greater than the second duty cycle $DC_{LED2}$ of the inactive adjustment curve $DC_{INACTIVE}$.

As shown in FIG. 10, the active and inactive adjustment curves $DC_{ACTIVE}$ and $DC_{INACTIVE}$ are non-linearly related (e.g., not proportional). The difference between the active and inactive adjustment curves $DC_{ACTIVE}$ and $DC_{INACTIVE}$ is non-linear as the ambient light level ranges from the minimum ambient light level $L_{AMB-MIN}$ to the maximum ambient light level $L_{AMB-MAX}$. The values of the active and inactive adjustment curves $DC_{ACTIVE}$ and $DC_{INACTIVE}$ may be chosen so that the button 104 having the indicia 120 of the active preset may be visually distinguished (e.g., visually brighter) than the buttons 104 having the indicia 120 of the inactive presets across a range of typical ambient light levels (e.g., between the minimum ambient light level $L_{AMB-MIN}$ and the maximum ambient light level $L_{AMB-MAX}$). The values of the active and inactive adjustment curves $DC_{ACTIVE}$ and $DC_{INACTIVE}$ may also be chosen so that the indicia 120 on both the button 104 having the indicia 120 of the active preset and the buttons 104 having the indicia 120 of the inactive presets may be read across a range of typical ambient light levels (e.g., between the minimum ambient light level $L_{AMB-MIN}$ and the maximum ambient light level $L_{AMB-MAX}$).

Figure 12:
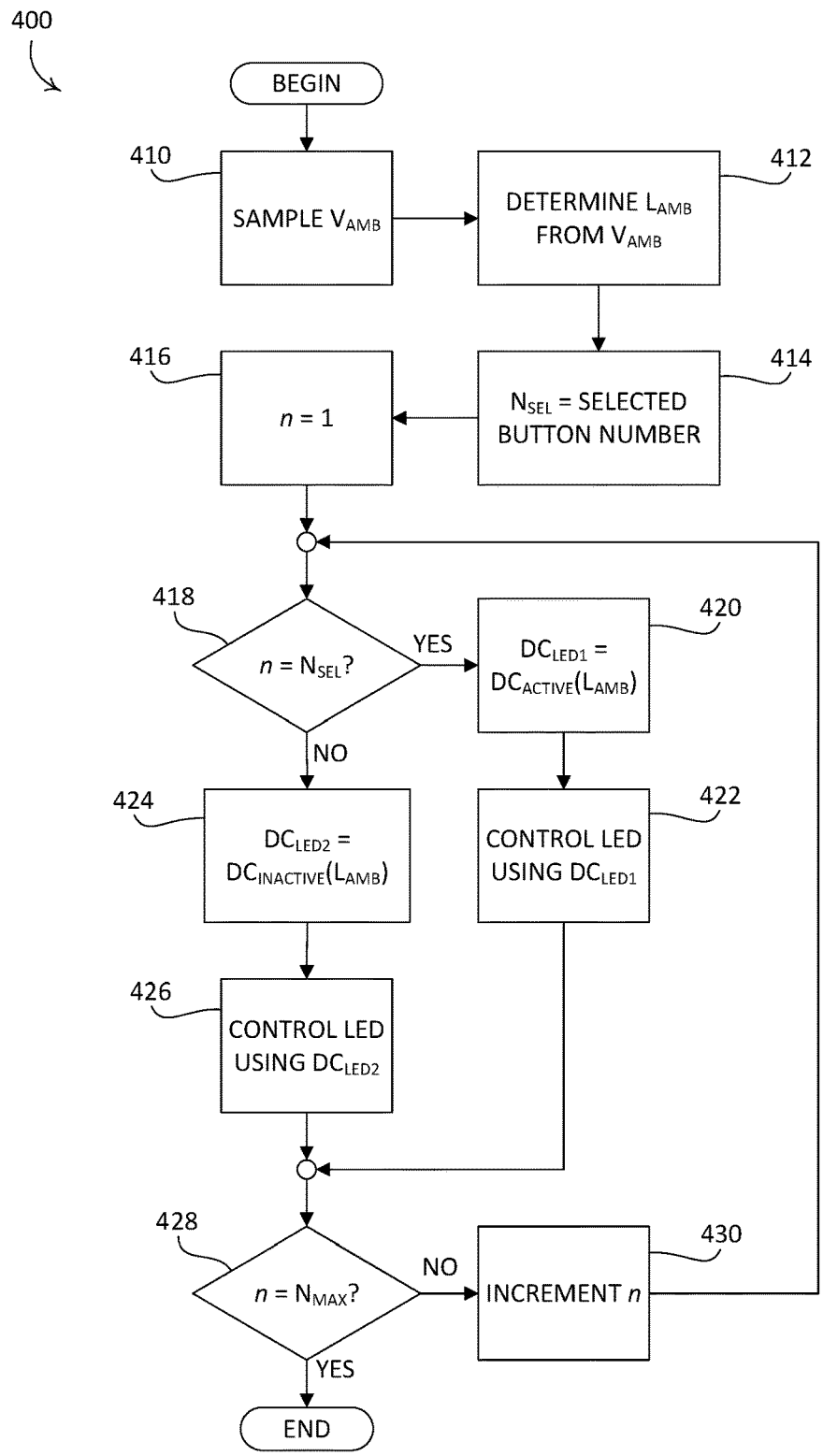
FIG. 12 depicts an example backlighting process that may be implemented in the example control device illustrated in FIG. 1.

FIG. 12 depicts an example backlighting process 400 that may be executed periodically by a control circuit, such as the control circuit 310, for backlighting a plurality of buttons of a control device, for instance the buttons 104 of the keypad 100. At 410, the control circuit 310 may sample the ambient light detect signal $V_{AMB}$, and may determine the measured ambient light level $L_{AMB}$ using the magnitude of the ambient light detect signal $V_{AMB}$ at 412.

At 414, the control circuit 310 may set a selected-button number $N_{SEL}$ to be equal to the presently selected button (e.g., the button 104 having indicia 120 indicating the active or selected preset or scene). For example, the number $N_{SEL}$ may be one (1) for the top button, two (2) for the second button, three (3) for the third button, and four (4) for the bottom button of the keypad 100 shown in FIG. 1. In other words, if the "Evening" button is the selected button, the control circuit 310 will set the number $N_{SEL}$ to three (3) at 414. During the backlighting process 400, the control circuit 310 may step through the LEDs 322 behind each of the buttons 104 and may determine a correct LED illumination intensity for each of the buttons 104. The control circuit 310 may use a variable n for stepping through the LEDs 322 during the backlighting process 400. At 416, the control circuit 310 may initialize the variable n to one (1).

At 418, if the variable n is equal to the selected-button number $N_{SEL}$ (e.g., the present button is the selected button), the control circuit 310 may determine the first LED duty cycle $DC_{LED1}$ for the nth LED from the active adjustment curve $DC_{ACTIVE}$ (e.g., as shown in FIG. 10) using the measured ambient light level $L_{AMB}$ at 420. The control circuit 310 may then pulse-width modulate the LED current conducted through the $n^{th}$ LED using the first LED duty cycle $DC_{LED1}$ at 422. If the variable n is not equal to the selected-button number $N_{SEL}$ at 418, the control circuit 310 may determine the second LED duty cycle $DC_{LED2}$ for the $n^{th}$ LED from the inactive adjustment curve $DC_{INACTIVE}$ (e.g., as shown in FIG. 10) using the measured ambient light level $L_{AMB}$ at 424 and may pulse-width modulate the LED current conducted through the $n^{th}$ LED using the second LED duty cycle $DC_{LED2}$ at 426.

At 428, the control circuit 310 may determine if the variable n is equal to a maximum number $N_{MAX}$ (e.g., the number of buttons 104 on the keypad 100). If the variable n is not equal to the maximum number $N_{MAX}$ at 428, the control circuit 310 may increment the variable n by one at 430, and the backlighting process 400 may loop around to control the intensity of the next LED 322. If the variable n is equal to the maximum number $N_{MAX}$ at 428, the backlighting process 400 may end.

The invention claimed is:

1. A control device comprising:
   a button having an indicia;
   a light source that is configured to backlight the indicia of the button;
   a light detector circuit that is configured to measure a light level of ambient light that is external relative to the control device;
   a control circuit that is configured to, responsive to an actuation of the button, cause the light source to backlight the indicia of the button in accordance with the measured light level; and
   an enclosure that houses the light detector circuit, the enclosure including an integral reflector that is configured to direct the ambient light to the light detector circuit.

2. The control device of claim 1, wherein the control circuit is configured to adjust the light source in response to a change in the measured light level.

3. The control device of claim 2, wherein the control circuit is configured to adjust the light source to backlight the button at a first illumination intensity when the button has been selected, and wherein the control circuit is configured to adjust the light source to backlight the button at a second illumination intensity when the button has not been selected.

4. The control device of claim 1, wherein the button is a first button, the indicia is a first indicia, and the light source is a first light source, the control device further comprising:
   a second button having a second indicia; and
   a second light source that is configured to backlight the second indicia of the second button, wherein the control circuit is configured to, responsive to an actuation of the second button, cause the second light source to backlight the second indicia of the second button in accordance with the measured light level.

5. The control device of claim 4, wherein the control circuit is configured to control the first light source at a first illumination intensity and the second light source at a second illumination intensity.

6. The control device of claim 1, wherein the light detector circuit comprises a photodiode.

7. The control device of claim 6, further comprising:
   a printed circuit board on which the control circuit and the photodiode are mounted,
   wherein the enclosure defines a recess that exposes the photodiode.

8. The control device of claim 7, wherein the reflector comprises a reflective surface that is configured to direct the ambient light onto a light-receiving surface of the photodiode.

9. The control device of claim 8, wherein the reflective surface comprises as a parabolic reflector that focuses the ambient light onto the light-receiving surface of the photodiode.

10. The control device of claim 8, wherein the reflective surface is concave.

11. The control device of claim 8, wherein the reflective surface defines an upper edge that is spaced from a surface of the printed circuit board on which the photodiode is mounted, such that the upper edge extends over a portion of the photodiode.

12. The control device of claim 1, further comprising:
   a faceplate that defines an opening that extends therethrough and that is configured to at least partially receive the button; and
   an adapter that is configured to be mounted to a structure, the adapter including an outer wall that defines an aperture through which the light detector circuit receives the ambient light.

13. The control device of claim 12, wherein the adapter and the faceplate are configured such that the faceplate is removably attachable to the adapter.

14. The control device of claim 12, wherein an outer perimeter of the faceplate extends beyond the outer wall of the adapter so as to hide the aperture from view.

15. The control device of claim 12, wherein the enclosure is configured to be attached to an inner surface of the faceplate.

16. The control device of claim 12, further comprising:
a pair of mounting tabs that are configured for removable attachment to the adapter.

17. The control device of claim 16, wherein a first mounting tab of the pair comprises a light guide that is configured to guide the ambient light from the aperture to the light detector circuit.

18. The control device of claim 17, wherein the light guide defines a lower surface, and wherein a portion of the lower surface is configured to align substantially flush with an outer surface of the outer wall when the first mounting tab is attached to the adapter.

19. The control device of claim 17, wherein the light guide defines a lower surface, and wherein a portion of the lower surface is configured to extend beyond an outer surface of the outer wall when the first mounting tab is attached to the adapter.

20. The control device of claim 17, wherein the enclosure defines a recess that exposes a portion of the light detector circuit, and wherein the light guide defines a tab that is configured to be received in the recess.

21. The control device of claim 12, wherein the outer wall is a lower wall of the adapter.

* * * * *